United States Patent Office 3,542,740
Patented Nov. 24, 1970

3,542,740
FIRE-RETARDANT POLYURETHANES
Charles Theodore Pumpelly and Eric Russell Larsen, Midland, Mich., assignors to The Dow Chemical Company, Midland, Mich., a corporation of Delaware
No Drawing. Continuation-in-part of application Ser. No. 430,160, Feb. 3, 1965. This application July 1, 1968, Ser. No. 741,339
Int. Cl. C08g 22/16
U.S. Cl. 260—77.5
2 Claims

ABSTRACT OF THE DISCLOSURE

A first resistant polyurethane coating composition comprising the reaction product of: (I) a polyether polyol, such as polypropylene glycol, having a hydroxyl equivalent weight of about 600 to about 1200, (II) an organic polyisocyanate, (III) a polybrominated aliphatic hydroxyl containing compound selected from the group consisting of 3-bromo-2,2-bis(bromomethyl)propanol and 2,2-bis-bromomethyl)-1,3-propanediol in amount such that the finished resin contains from about six to about twenty percent by weight of bromine, and (IV) additional polyhydric alcohol such as trimethylol propanol so as to maintain an —NCO/—OH ratio of from about 1.0 to about 1.8.

---

This application is a continuation-in-part of our prior application, Ser. No. 430,160, filed Feb. 3, 1965 and now abandoned.

This invention relates to novel fire-resistant polyurethane compositions. More particularly the present invention resides in bromine containing polyurethane coating compositions having coreacted therein a brominated mono or dihydric alcohol or a mixture thereof.

Polyurethane coatings are becoming widely used in place of conventional varnishes for giving tough, abrasive-resistant coating to wood and other materials. These coatings, like varnish, contribute significantly to the flammability of the product and to the rapid spread of fire.

The methods of the prior art have attained fire-resistance in urethane compositions by the use of various substances, such as the various phosphate or phosphonate esters or chlorinated compounds. However, such substances are additives which are not chemically combined with the polyurethane plastic and are progressively lost from the plastic by evaporation, leaching and the like. Consequently, the product does not have a permanently reduced flammability.

It is widely recognized that bromine compounds are effective fire retardant agents for flame proofing plastics, including polyurethanes. However, aliphatic bromine compounds are generally too unstable to be useful in coating applications, since the inclusion of sufficient bromine compound to render the coating fire-resistant usually gives a product that yellows rapidly on exposure to sunlight.

It is, therefore, an object of the present invention to provide a fire-resistant polyurethane coating composition comprising one or more aliphatic polyols, a polyisocyanate, and a brominated mono or polyhydric alcohol or a mixture thereof as a fire-retarding additive.

Other objects of this invention and the nature and advantages of the invention will further appear from the following more detailed description.

In accordance with the present invention polyurethane coating compositions satisfying the aforementioned objects can be prepared by reacting together: (I) a polyether polyol having a hydroxyl equivalent weight of about 600 to about 1200, (II) an organic polyisocyanate, (III) a polybrominated mono- or polyhydric alcohol in amount such that the finished resin contains from about six to about twenty percent by weight of bromine, and (IV) additional polyhydric alcohol, such as trimethylol propane, so as to maintain an —NCO/—OH ratio of from about 1.0 to about 1.8.

The difunctional polyether polyol component of the present invention is typically polypropylene glycol having a molecular weight of about 1200. Additional alcohols are also employed in the polyurethane composition in order to maintain an —NCO/—OH ratio of from about 1.0 to about 1.8. These are glycerol, hexanetriol, butanetriol, trimethylol propane, trimethylol ethane, pentaerythritol, etc. Preferably the additional polyhydric alcohol is trimethylol propane.

A large number of organic polyisocyanates may be used. The aromatic polyisocyanates are more reactive and less toxic than the aliphatic members, and are consequently preferred. The compounds which are most readily available commercially are 2,4-toluene diisocyanate, 2,6-toluene diisocyanate and mixtures thereof. Other useful organic polyisocyanates are m- and p-phenylene diisocyanate, 4,4'-methylenebis(phenyl isocyanate), 3,3'-dimethyl-4,4'-biphenylene diisocyanate and the like.

The brominated mono- and polyhydric alcohols to be employed are 2,2-bis(bromomethyl)-1,3-propanediol and 3 - bromo - 2,2 - bis(bromomethyl)propanol. Such compounds may be prepared by methods shown in Berlow, Barth, and Snow, "The Pentaerythritols," ACS Monograph No. 136, Reinhold Publishing Corp., p 104 (1958).

It is desirable to use a flow control agent in the composition, preferably cellulose acetate butyrate. These compounds produce a smooth flowing coating composition capable of providing a uniform thickness and consistency.

Various antioxidants and stabilizers may also be incorporated into the composition. It is desirable, according to the present invention, to use an antioxidant, e.g. 2,6-di-tert-butyl-4-methyl phenol, as a stabilizer.

Suitable solvents beneficially used in practice of the invention are aromatic hydrocarbons, such as benzene, xylene, mineral spirits and the like. Cellosolve acetate is also beneficially used to afford solvation for the flow control additives.

The invention is further illustrated by the following examples, which are illustrative only and are not to be construed as limiting its scope.

EXAMPLE I (A) A basic formulation was prepared by mixing 247.10 grams of polypropylene glycol having a molecular weight of about 1200, with 5.68 grams of cellulose acetate butyrate as a flow control agent. To this was added 2.81 grams of 2,6-di-tert-butyl-4-methyl phenol, to act as an antioxidant and stabilizer. To this was added, as solvents, 192.10 grams of Cellosolve acetate, 192.10 grams xylene, and 450 grams benzene.

(B) An aliquot portion of 109 grams of (A) above, was added to a suitable reaction vessel along with 1.22 grams of trimethylol propane and 18 grams of 2,2-bis-(bromomethyl)-1,3-propanediol. The mixture was dried by azeotropic distillation under nitrogen; removing the benzene after all of the water had been removed. The residue was cooled to 50° C. A charge of 28.7 grams of toluene diisocyanate was added dropwise, while stirring and maintaining the temperature of the mixture below 80° C. until the initial reaction was completed. The mixture was then heated at 90° C. for three hours.

The resultant product was a curable resin prepared from a mixture of reactants having a —NCO/—OH ratio of approximately 1.6/1, and contained sufficient bromine to give the cured resin a bromine content of approximately 9.8 percent by weight.

Burning tests were conducted on the cured resin by painting the curable liquid resin on the untreated side of 6 x 12 inch Celotex panels. Test specimens were prepared with one coat of resin, and were cured approximately three months under ambient laboratory conditions of temperature and about 50 percent relative humidity.

In the burning test the test panels were held at a 45° angle with the horizontal. A flat-bottomed sheet iron cup of ⅝ inch internal diameter and 9/32 inch depth, was placed on a support, positioning the cup so that the center of its base was one inch vertically below that midpoint of the test specimen.

Three-tenths (0.3) milliliter of absolute ethanol was placed in the cup and ignited. The time required for the first flame to appear on the panel, the time for the alcohol flame to go out, and the time required for the flame on the panel to go out, were observed and measured. If the flame continued to spread or burn for approximately 60 seconds after the alcohol flame went out, the flame was extinguished. The area charred was measured. The charred area is a measure of the flammability of the coating.

tages of polyurethane coatings is their tendency to turn yellow upon exposure to light when they have been applied to a surface. This is especially true when halogen compounds are added to the coating compositions. The brominated mono and polyhydric alcohols of the present invention retard yellowing of the coatings, thereby permitting a more attractive finish than the prior art polyurethane coating compositions.

EXAMPLE IV

Several formulations were made with the basic formulation of Example I plus trimethylol propane and $C(CH_2Br)_2(CH_2OH)_2$. In these formulations the ratio of trimethylol propane, brominated polyol and toluene diisocyanate were adjusted to give the desired halogen content without changing the —NCO/—OH ratio.

Samples for photochemical stability studies were prepared by painting 4" by 6" pieces of white tag board with the various coatings. The samples were allowed to cure for approximately one week under ambient conditions of temperature and humidity.

TABLE I

| Run No. | Bromo-alcohol | Bromine, wt. percent | Coats | Flame on panel, sec. | Alcohol, flame out, sec. | Panel flame out, sec. | Charred area, cm.² |
|---|---|---|---|---|---|---|---|
| 1 | Blank | 0 | 2 | 24 | 57 | 30 | >189 |
| 2 | $C(CH_2Br)_2(CH_2OH)_2$ | 9.8 | 2 | 24 | 52 | 34 | 82 |
| 3 | $C(CH_2Br)_3CH_2OH$ | 9.8 | 2 | 22 | 47 | 54 | 160 |
| 4 | $C(CH_2Br)_2(CH_2OH)_2$ | 9.8 | 3 | 22 | 47 | 33 | 57 |
| 5 | $C(CH_2Br)_3CH_2OH$ | 9.8 | 3 | 24 | 54 | 54 | 148 |
| 6 | $C(CH_2Br)_2(CH_2OH)_2$ | 6.2 | 1 | 20 | 49 | 40 | 97 |

Note.—Run No. 1 extinguished flame on panels.

Smaller charred area means lower flammability. The flame went out in 45 seconds and resulted in a charred area of 146 square centimeters.

For comparison a similar composition was prepared by employing 6.18 grams of 1,3-butylene glycol in place of the 2,2-bis(bromomethyl)-1,3-propanediol used in part (B) above, i.e., a chemically equivalent proportion of the 1,3-butylene glycol. The charred area, after the flame was extinguished, was greater than 213 square centimeters.

Since there is free —NCO in the resultant product, it is stored under a nitrogen atmosphere until used.

EXAMPLE II

To 114 grams of the basic formulation (A) of Example I was added 11.5 grams of 2,2-bis(bromomethyl)-1,3-propanediol, $C(CH_2Br)_2(CH_2OH)_2$, and 1.22 grams trimethylol propane. This mixture was placed in a reaction vessel and 28.7 grams of toluene diisocyanate were added dropwise to the mixture and the reaction carried out in the manner set forth in Example I.

The resultant product had a —NCO/OH ratio of approximately 1.5, and contained sufficient bromine compound to give the cured resin a bromine content of approximately 6.2 percent.

EXAMPLE III

To 109 grams of the basic formulation (A) of Example I there was added 15 grams of 3-bromo-2,2-bis(bromomethyl)propanol, $C(CH_2Br)_3CH_2OH$, and 5.29 grams trimethylol propane. This mixture was placed in a reaction vessel and 28.7 grams of toluene diisocyanate were added dropwise to the mixture and the reaction carried out in the manner set forth in Example I.

The —NCO/—OH ratio was 1.6/1, and the bromine content of the cured resin was 9.8 percent.

Burning tests were carried out on cured coatings of one, two and three layers made from the resins of Examples I, II and III, employing procedure similar to that employed in Example I. The results are reported in Table I.

An additional advantage of the present invention over the prior art is retardation of yellowing of the applied coating. It is well known that one of the serious disadvan- Sections of sample measuring approximately 1½" x 3" were exposed to artificial sunlight in an Atlas Fade-O-Meter for either 24 or 50 hours. The exposed samples were then compared with unexposed samples by ASTM designated method D–1925–63T to determine the change in yellowness index (ΔYI). The results of these experiments are shown in the following Table II.

TABLE II.—PHOTOCHEMICAL STABILITY OF URETHANE COATINGS CONTAINING $C(CH_2Br)_2(CH_2OH)_2$

[Exposure time, 50 hours]

| Sample No. | Bromine, wt. percent | YI, unexposed | YI, exposed | ΔYI |
|---|---|---|---|---|
| For comparison: | | | | |
| 1 | 0 | 8.9 | 39.4 | 30.5 |
| 2 | 0 | 9.0 | 37.5 | 28.5 |
| 3 | 0 | 7.1 | 43.5 | 36.4 |
| This invention: | | | | |
| 4 | 1.62 | 8.0 | 37.3 | 29.3 |
| 5 | 3.2 | 6.5 | 35.4 | 28.9 |
| 6 | 6.15 | 7.4 | 36.7 | 29.3 |
| 7 | 9.81 | 8.3 | 39.1 | 30.8 |

In Table II it can be seen that the yellow indices for samples 4–7 (of this invention) were actually below that of blank samples (1–3) containing all of the ingredients the same except for the halogenated compound.

EXAMPLE V

Several formulations using the basic formulation of Example I and trimethylol propane and various brominated polyols were made by the method described in that example. In all cases the —NCO/—OH ratio was kept constant by varying the ratio of trimethylol propane, brominated polyol and toluene diisocyanate. Test specimens were prepared as in Example IV and tested according to ASTM D–1925–63T. The results are listed in Table III.

TABLE III.—PHOTOCHEMICAL STABILITY OF POLYURETHANE COATINGS CONTAINING VARIOUS FIRE RETARDANT AGENTS
[Exposure time, 24 hours]

| Sample No. | Agent | Halogen, wt. percent | YI, unexposed | YI, exposed | $\Delta$ YI |
|---|---|---|---|---|---|
| This invention: | | | | | |
| 8 | $C(CH_2Br)_2(CH_2OH)_2$ | 9.8 | 8.4 | 26.6 | 18.2 |
| 9 | $C(CH_2Br)_3CH_2OH$ | 9.8 | 7.5 | 41.6 | 34.1 |
| For comparison: | | | | | |
| 10 | $C(CH_2Cl)_2(CH_2OH)_2$ | 10.0 | 9.9 | 48.2 | 38.3 |
| 11 | $C(CH_2Cl)_3CH_2OH$ | 10.0 | 11.4 | 49.9 | 38.5 |
| 12 | $CH_2BrCH_2OH$ | 10.4 | 10.5 | 60.2 | 49.7 |
| 13 | $CH_2BrCHBrCH_2OH$ | 10.0 | 10.3 | 71.0 | 60.7 |
| 14 | $CH_2BrCHOHCH_2Br$ | 10.0 | 14.7 | 71.2 | 56.5 |
| 15 | A | 10.0 | 21.1 | 60.7 | 39.6 |

A = $CH(CH_2OCH_2CHOHCH_2Br)_2OCH_2CHOHCH_2Br$.

In Table III compounds of this invention were compared with other halogenated compounds with the former being significantly better in color properties than the latter.

In addition, the polyurethane coatings of the present invention exhibit outstanding flexibility, hardness, chemical and solvent resistance, abrasion resistance and durability. These properties make the compositions, hereinabove described, extremely useful for both commercial and home use as attractive, protective coatings.

We claim:

1. A fire resistant polyurethane coating composition comprising the reaction product of: (I) a polyether polyol having a hydroxy equivalent weight of about 600 to about 1200, (II) an organic polyisocyanate, (III) a polybrominated aliphatic hydroxyl containing compound selected from the group consisting of 3-bromo-2,2-bis(bromomethyl)propanol and 2,2-bis(bromomethyl)-1,3-propanediol in amount such that the finished resin contains from about six to about twenty percent by weight of bromine, and (IV) additional polyhydric alcohol containing at least 3 hydroxyl groups so as to maintain an —NCO/—OH ratio of from about 1.0 to about 1.8.

2. The fire-resistant polyurethane coating composition of claim 1 wherein the organic polyisocyanate is toluene diisocyanate.

References Cited
FOREIGN PATENTS
575,430    5/1959    Canada.

DONALD E. CZAJA, Primary Examiner

M. J. WELSH, Assistant Examiner

U.S. Cl. X.R.

117—136, 148, 161; 260—13, 31.4, 33.6, 45.95